United States Patent [19]

Gröne

[11] E Patent Number: Re. 33,143

[45] Reissued Date of Patent: Jan. 9, 1990

[54] TRAY FOR RECEIVING FOODSTUFFS AND A PROCESS AND APPARATUS FOR PRODUCING IT

[75] Inventor: Horst-Ditmar Gröne, Schwanewede, Fed. Rep. of Germany

[73] Assignee: Lin Tec Verpackungstechnik GmbH, Fed. Rep. of Germany

[21] Appl. No.: 332,226

[22] Filed: Mar. 31, 1989

Related U.S. Patent Documents

Reissue of:

[64] Patent No.: 4,702,377
Issued: Oct. 27, 1987
Appl. No.: 799,707
Filed: Nov. 19, 1985

[51] Int. Cl.[4] ..... B65D 1/34; B65D 6/04

[52] U.S. Cl. ..... 206/557; 220/405

[58] Field of Search ..... 206/557; 220/418, 444, 220/458, 465, 470, 405

[56] References Cited

U.S. PATENT DOCUMENTS

| | | | |
|---|---|---|---|
| 3,156,402 | 11/1964 | Dupuis | 206/557 |
| 3,346,400 | 10/1967 | Roesner | 206/557 |
| 3,468,468 | 9/1969 | Foote | 206/557 |
| 3,715,218 | 2/1973 | Feely | 206/557 |
| 3,894,679 | 7/1975 | Reifers et al. | 206/557 |
| 3,915,532 | 10/1975 | Ashton | 206/557 |
| 4,469,270 | 9/1984 | Gartland | 206/557 |
| 4,551,365 | 11/1985 | Bonis | 206/557 |

*Primary Examiner*—Joseph Man-Fu Moy
*Attorney, Agent, or Firm*—Varnum, Riddering, Schmidt & Howlett

[57] ABSTRACT

The tray for packs of especially liquid-secreting foodstuffs (for example, meat) is produced from a three-layer sheet, the two outer layers (11, 12) of which consist of foamed polystyrene, while a middle enclosed sheet consists of a narrower strip-shaped insert (13) made of absorbent material (for example, fibrous paper material). In the regions left uncovered by the narrower insert (13), the outer layers (11, 12) are connected directly to one another by means of gluing, welding, etc. The upper layer (11) pointing towards the packaged article has holes (14) which are continuous to the insert (13) and through which liquid (for example, meat juice) flows off and is then stored in the absorbent insert (13).

5 Claims, 5 Drawing Sheets

TRAY FOR RECEIVING FOODSTUFFS AND A PROCESS AND APPARATUS FOR PRODUCING IT

Matter enclosed in heavy brackets [ ] appears in the original patent but forms no part of this reissue specification; matter printed in italics indicates the additions made by reissue.

The invention relates to a tray for receiving foodstuffs, especially those secreting liquids, such as, for example, meat, fish, poultry, etc. The invention also relates to a process for producing a tray, and to an apparatus for producing trays.

In general, the problem arising in the packaging of foodstuffs, which secrete liquids, especially meat, etc., is that, on the one hand, the packs should be as air-tight and liquid-tight as possible, and, on the other hand, the liquids, such as, for example, blood, meat juice, etc., escaping from the foodstuff during transport and storage should not flow freely inside the pack, since this is considered disagreeable by the consumer and, when the pack is opened or is even damaged during storage and transport, makes the liquids run out and thus causes soiling.

Trays of this type have previously been made of cardboard which is absorbent to a certain extent and consequently absorbs the liquids. However, such cardboard trays become soft in time and consequently lose their leak-proofing property, so that bacteria can also arise. To an increasing extent, therefore, trays of this type are nowadays made of foamed liquid-tight plastic, for example polystyrene.

In plastic trays of this type, to absorb liquids it is known to place a layer of absorbent material, especially paper, on the floor (topside) of the tray. A multi-layer paper blank, liquid-tight on its topside, has been used for this purpose. It is known to use parchment for this uppermost layer. Several absorbent layers are arranged under it. The liquid or meat juice can therefore enter the region of the absorbent layers and be absorbed from the sides only. Since this insert is deformed as a result of the absorption of liquid, however, troughs from which the liquid cannot flow off form there. Also, this paper insert has an unattractive appearance, so that the consumer is give the impression that the pack in unhygienic. Moreover, the outlay in production terms involved in providing these paper blanks is relatively high, in particular that involved in attaching them to the floor of the tray by means of adhesive.

The object of the invention is, therefore, to provide a tray of the type mentioned in the introduction, which is liquid-tight, absorbent to a great extent and simple to produce, as well as a process and an apparatus for producing it.

Accordingly, in the invention, the absorbent material is [embedded] *disposed* in the tray itself. On the inside, the tray is provided, in the region of this absorbent material, with orifices which pass through the originally leak-proof outer skin of the tray, thus making a connection with the inner absorbent layer. Thus, the liquid from the packaged article passes through the orifices into the absorbent layer and is absorbed here with a high capacity. No liquid remains in the tray. Also, there are no relatively large stains or residues of liquid, such as, for example, blood or meat juice, on the inside of the tray.

According to the invention, the absorbent insert is made strip-shaped, its width being such that the insert does not extend into the regions of the raised side walls of the tray. Thus, in the longitudinal direction of the tray, the insert is limited to the region of the floor surface, and it covers at least the regions of the orifices in the inner tray.

In the longitudinal direction of the tray, the nonabsorbent insert also extends in the regions of the raised transverse side walls, that is to say from edge to edge.

The trays according to the above invention can be produced continuously. Two sheets of plastic, especially foam material, preferably extruded polystyrene or expanded polystryrene, are each drawn off directly from an extruder or from a reel and brought together, at the same time receiving a middle sheet of absorbent material, especially paper. Because the width of the sheet of absorbent material is small, the trays are connected together in the regios of the raised side walls directly adjacent to one another, specifically either by gluing or by sealing or welding. In the first-mentioned case, an adhesive is coated on, for example via a sheet dye, specifically on the lateral region of the plastic sheet not covered by the absorbent insert. After the sealing or welding operation, the side walls of the tray which are left free of the non-absorbent insert can be connected together either as a result of the heating of the surfaces to be joined to one another by means of conventional radiant heaters or else by means of heated transport or deflection rollers.

The orifices in the (inner) layer of the tray are appropriately designed as continuous stamped-out portions which, where rectangular or square trays are concerned, are arranged in parallel, especially lateral rows, specifically over the entire length, that is to say also in the region of the raised transverse side walls. The holes are preferably stamped out before the three sheets are brought together, specifically preferably as a result of the perforation of the (upper) plastic sheet.

In this stamping operation, it is possible to ensure, for example as a result of the additional effect of heat, that the regions surrounding the holes are made funnel-shaped so that the drainage effect is improved.

An examplary embodiment of the invention is explained below with reference to the drawings. In the drawings.

Figure 1:
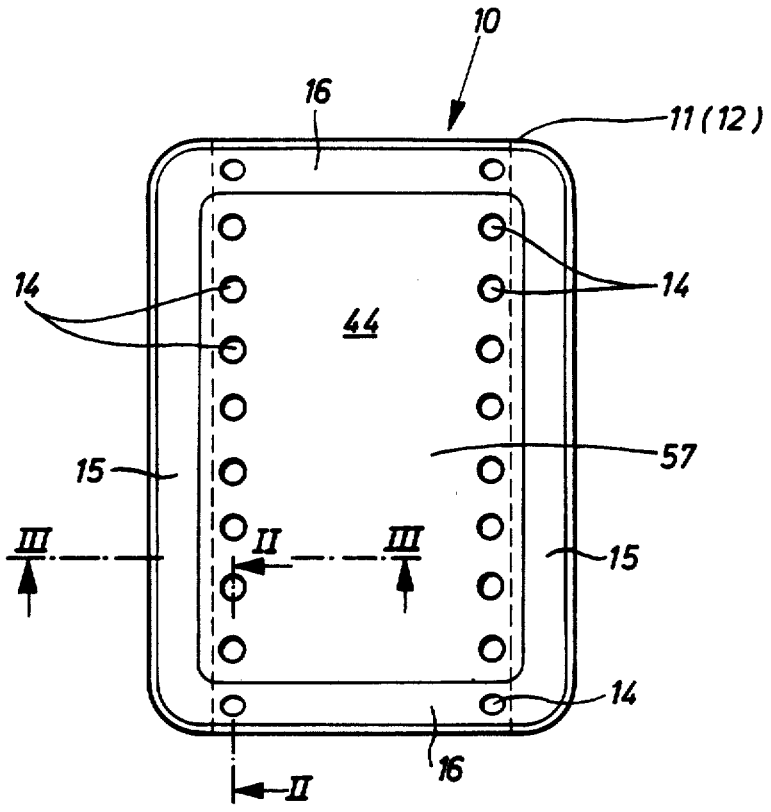
FIG. 1 shows a plan view of a tray.

FIGS. 1 to 4 show a rectangular tray 10. This consists of three layers, in particular an upper layer 11, a lower layer 11 and an intermediate absorbent insert 13. The two layers 11 and 12 preferably consist of foamed plastic, for example polystyrene. The absorbent insert 13 consists especially of paper, such as, for example, absorbent fibrous material. Edges projecting upwards are formed in lateral regions of the tray 10, in particular side edges 15 extending in the longitudinal direction of the tray 10 and transverse side edges 16 extending in the transverse direction.

Figure 2:
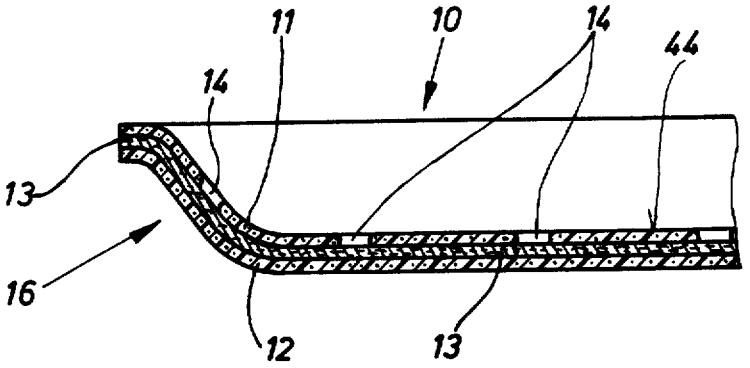
FIG. 2 shows an enlarged longitudinal section II—II through the tray in the region of several orifices.

In the bottom wall 44 of the tray 10, the upper layer 11 has a plurality of orifices 14 which extend through to the absorbent insert 13. In the present exemplary embodiment, these orifices 14 are distributed uniformly over the upper layer 11, specifically in two parallel rows extending in lateral regions along the tray 10. Each row has orifices 14 arranged in succession at approximately the same distance from one another, the rows having orifices 14 not only in the bottom wall 44 of the tray 10, but also in the transverse side walls 16. As can be seen particularly in FIG. 4, the orifices 14 are designed as continuous cylindrical holes. Towards the inside of the tray 10, the orifices 14 are made funnel-shaped. For this purpose, the upper edges of the orifices 14 are rounded off in a continuous radius which starts from the surface of the upper layer 11 directed towards the inside of the tray 10 and ends in the orifices 14. FIGS. 1 and 2 also show that the orifices 14 extending in the region of the transverse side walls 16 are slightly oval as a result of the erection of the transverse side walls 16 during the deep-drawing of the tray 10.

Figure 3:
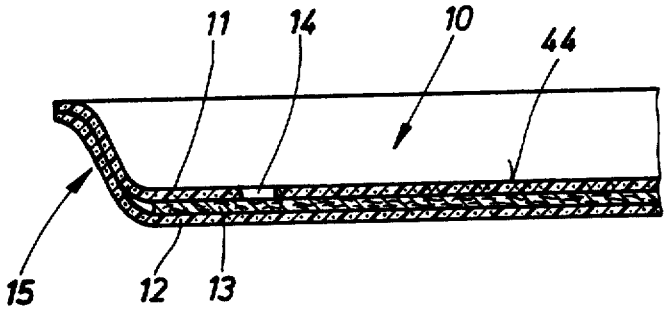
FIG. 3 shows an enlarged cross-section III—III through the tray in the region of one orifice.
Figure 4:
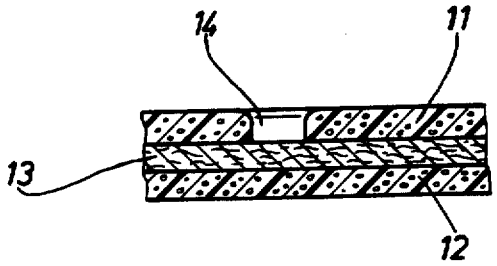
FIG. 4 shows a further-enlarged cut-out IV taken from the illustration in FIG. 3.

FIGS. 1 and 3 show that the absorbent insert 13 extends in a direction transverse relative to the tray 10 only over the bottom wall 44 of the latter. Because of this, the side walls projecting upwards consist only of two layers, in particular the layers 11 and 12, which rest directly on one another there and are connected together, for example by means of gluing, hot-sealing and/or welding. The width of the strip-shaped insert 13 can be reduced in comparison with the illustration in FIG. 3 at most so that the insert 13 still covers all the orfices 14.

As shown in FIG. 2, as regards its length, the strip-shaped insert 13 extends over the entire length of the tray 10. As a result, the transverse side walls 16 are also made three-layered.

Figure 5:
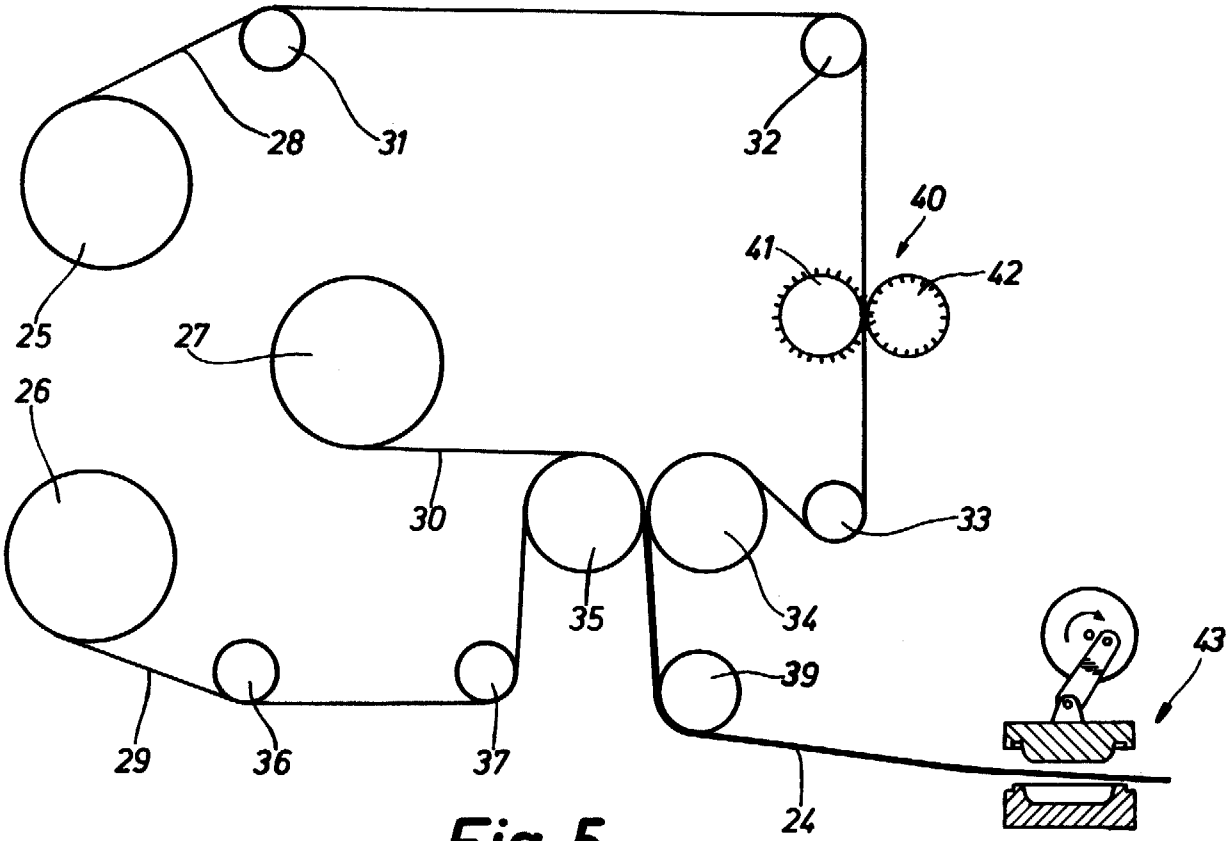
FIG. 5 shows a diagrammatic view of an apparatus for producing the tray.
Figure 6:
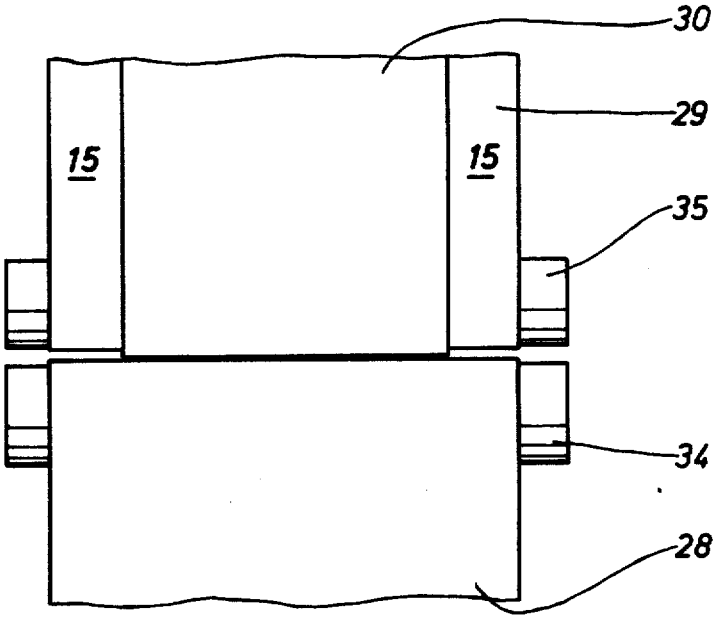
FIG. 6 shows a view of the nip at the connection station in FIG. 5.

FIG. 5 illustrates diagrammatically an apparatus for producing the three-layer tray 10 according to the invention. Two plastic sheets 28 and 29 for the upper layer 11 and the lower layer 12 and a sheet 30 of absorbent material for the absorbent insert 13 are wound on three reels 25, 26 and 27. The upper sheet 28 for the upper layer 11 is guided via deflecting rollers 31 and 32 to a stamping station 40 where the orifices 14 are stamped in the upper layer 11. In this exemplary embodiment, the stamping station 40 consists of a stamping roller 41 provided with appropriate spikes and of an opposing counterroller 42, between which the upper sheet 28 is guided through for stamping. Subsequently, the upper sheet 28 now provided with orifices 14 is further deflected at a deflecting roller 33. From here, the upper sheet 28 is guided to a pair of press rollers 34 and 35, where the upper sheet 28 is combined with the middle sheet 30 unwound from a reel 27 and with the lower sheet 29 which comes from a reel 26 and which has previously been deflected via two deflecting rollers 36 and 37. It can be seen from FIG. 6 that the narrower middle sheet 30 is guided centrally between the wider top sheets 28 and 29, so that there will remain on both sides of the middle sheet 30 edge regions which have no intermediate layer and which serve for the subsequent formation of the side walls 15.

In the nip between the press rollers 34 and 35, adhesive is coated on to the sheets 28 and 29 by a device (not shown), specifically preferably only in edge regions not covered by the middle sheet. As a result, the three-layer material thus formed is glued only where the upper sheet 28 and lower sheet 29 for the upper layer 11 and the lower layer 12 are directly together.

Instead of gluing with an adhesive, the sheets 28 and 29 can also be hot-sealed to one another, pressure being exerted at the same time by means of the press rollers 34 and 35 which in this case are heated. The press rollers 34 and 35 can, if appropriate, be heated in such a way that a particularly intensive heat effect occurs at the points where the upper sheet 28 and the lower sheet 29 rest directly on one another. Even when adhesive is used, the press rollers 34 and 35 can be heated to cause the adhesive to harden more quickly. Alternatively, the regions of the sheets 28, 29 to be glued together can also be activated thermally by means of radiant heaters.

After the sheet material for the tray 10 has been connected together, the layered sheet 24 formed between the press rollers 34 and 35 is deflected at a further deflecting roller 39. From here, the layered sheet 24 is finally fed to a deep-drawing station 43 indicated diagrammatically in FIG. 5, in which the tray 10 is shaped from the layered sheet 24. At the same time, the finished tray 10 is also trimmed in the deep-drawing station 43, as a result of which the finished trays 10 are severed from the layered sheet 24, because the deep-drawing station 43 contains a trimming tool consisting of a collar projecting on the female mould and a corresponding recess in the male mould. It is also possible to heat the deep-drawing station 43 to connect the sheets 28 and 29 together, so that welding or the like of the layered sheet 24 only takes place when the deep-drawing station 43 is reached, instead of between the press rollers 34, 35 which in this case can be omitted.

Finally, it is also possible to feed the upper sheet 28 and lower sheet 29 to the apparatus illustrated in FIG. 5 by discharging them directly from two extruders and treating them further, at the same time deflecting them in an appropriate way. One extruder may also be sufficient to produce the sheets 28, 29, in particular if this extruder produces a sheet of double width which is severed to form the two sheets 28 and 29 and deflected in an appropriate why. In such a case, there is no longer any need for the reels 25 and 26.

Figure 7:
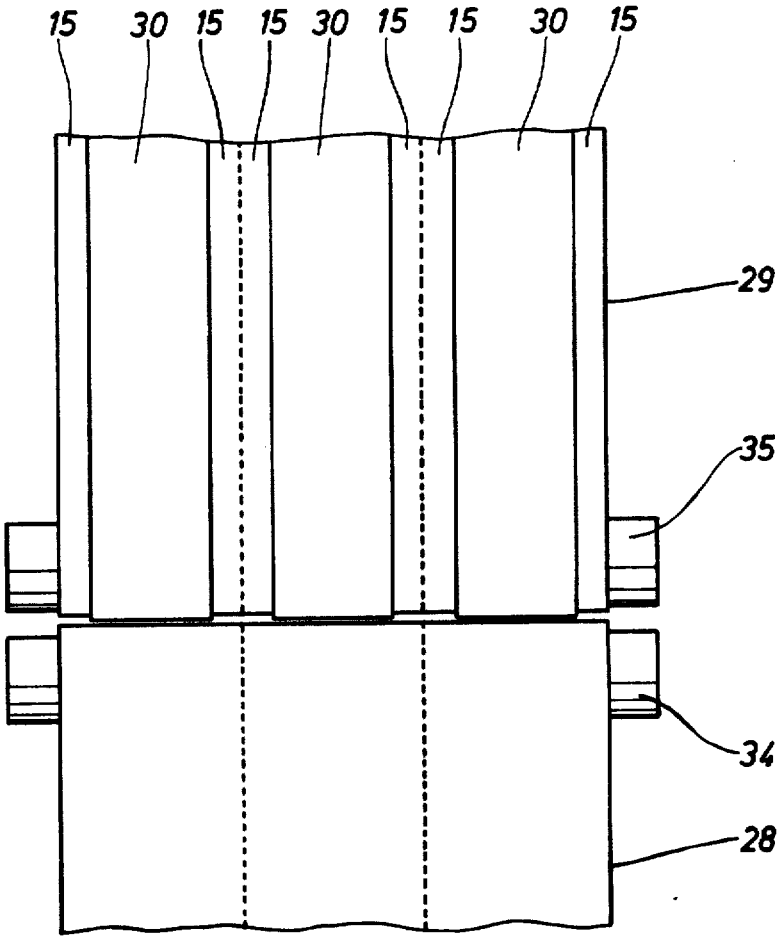
FIG. 7 shows a view similar to that of FIG. 6, but with several absorbent inserts lying next to one another.

FIG. 7 shows how several individual sheets for the trays 10 can be produced on one wider sheet. Here, three middle sheets 30 are laid on continuous sheets 28 and 29, specifically each at a distance from one another. These distances again form the lateral regions 16, in which the sheet 29 is then connected to the sheet 28. For further processing, the sheets can then be severed longitudinally (the broken lines in FIG. 7) or supplied to several (here three) parallel deep drawing stations 43.

What is claimed is:

1. Tray for receiving liquid-secreting foodstuffs and delicacies, for example meat, fish or poultry, and having a basic tray body having a length and a width and consisting of liquid-tight plastic and an absorbent insert, characterised in that the basic body consists of two layers (11, 12) of liquid-tight plastic between which is [embedded] *disposed*, centrally relative to a longitudinal plane between the layers, a liquid-absorbent insert (13), in that the upper layer (11) pointing towards the foodstuff has orifices (14), in that the insert (13) is strip-shaped with a smaller width than said two layers and extends over only a limited region of the tray, so that outside the region of the insert (13) the two layers (11, 12) are in direct contact with one another, in that said basic body has a bottom wall (44), in that the insert extends over the entire length of the two layers (11, 12), and in that the width of the insert (13) corresponds approximately to the width dimension of the bottom wall (44).

2. Tray according to claim 1, characterised in that the upper layer (11) and the lower layer (12) form, outside the region of the insert (13), two longitudinal side walls (15) projecting upwards from the bottom wall and which are directly joined to one another to hold the insert (13) loosely between the layers (11, 12).

3. Tray according to claim 2, characterised in that the orifices (14) are continuous holes in the upper layer (11), and are grouped in two parallel longitudinal rows overlying the insert (13) and extending into two opposite transverse side walls (16) which project upwardly from the bottom wall (44) and which extend transversly relative to the longitudinal side walls (15).

4. Tray according to claims 1, 2 or 3 wherein said liquid-tight plastic is a foam material selected from the group consisting of extruded polystyrene and expanded polystyrene.

*5. Tray according to claim 1, wherein said liquid-absorbent insert (13) is embedded between the two layers (11, 12).*

* * * * *